United States Patent
Petculescu et al.

(10) Patent No.: US 9,535,983 B2
(45) Date of Patent: Jan. 3, 2017

(54) TEXT SAMPLE ENTRY GROUP FORMULATION

(71) Applicant: Microsoft Technology Licensing, LLC, Redmond, WA (US)

(72) Inventors: Cristian Petculescu, Seattle, WA (US); Marius Dumitru, Sammamish, WA (US); Vasile Paraschiv, Redmond, WA (US); Amir Netz, Bellevue, WA (US); Paul Jonathon Sanders, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 14/066,505

(22) Filed: Oct. 29, 2013

(65) Prior Publication Data

US 2015/0120730 A1    Apr. 30, 2015

(51) Int. Cl.
    *G06F 17/30* (2006.01)
(52) U.S. Cl.
    CPC ... *G06F 17/30705* (2013.01); *G06F 17/30622* (2013.01); *G06F 17/30657* (2013.01)
(58) Field of Classification Search
    CPC .............. G06F 17/30705; G06F 17/30657; G06F 17/30622
    USPC ........................................................ 707/737
    See application file for complete search history.

(56) References Cited

U.S. PATENT DOCUMENTS

| | | | |
|---|---|---|---|
| 5,404,507 A | 4/1995 | Bohm et al. | |
| 6,980,976 B2 | 12/2005 | Alpha et al. | |
| 7,149,748 B1 * | 12/2006 | Stephan | G06F 17/30622 707/742 |
| 2004/0186826 A1 | 9/2004 | Choi et al. | |
| 2005/0251526 A1 | 11/2005 | Nayak | |
| 2006/0248087 A1 | 11/2006 | Agrawal et al. | |
| 2006/0259482 A1 | 11/2006 | Altevogt et al. | |
| 2010/0030796 A1 | 2/2010 | Netz et al. | |

FOREIGN PATENT DOCUMENTS

WO    0221325 A1    3/2002

OTHER PUBLICATIONS

"InterSystems Cache Technology Guide", Published on: Aug. 18, 2012, Available at: http://www.intersystems.com/cache/technology/techguide/cache_tech-guide_02.html.

(Continued)

*Primary Examiner* — Joshua Bullock
(74) *Attorney, Agent, or Firm* — Kate Drakos; Micky Minhas (57) ABSTRACT

Storing text samples in a manner that the text samples may be quickly searched. The text samples are assigned a text sample identifier and are each parsed to thereby extract text components from the text samples. Text components that have the same content are assigned the same text component identifier. For each parsed text component, a text component entry is created that includes the assigned text component identifier as well as the text sample identifier for the text sample from which the text component was parsed. A text sample entry group is created for each text sample that contains the text component entries in sequence for the text components found within the text sample. The text sample entry groups are stored so as to be scannable during a future search.

20 Claims, 7 Drawing Sheets

(56) References Cited

OTHER PUBLICATIONS

Zobe, et al., "An Efficient Indexing Technique for Full-Text Database Systems", In Proceedings of the 18th International Conference on Very Large Data Bases, Aug. 23, 1992, 11 pages.
Davis, et al., "Atlas: A Nested Relational Database System for Text Applications", In IEEE Transactions on Knowledge and Data Engineering, vol. 7, Issue 3, Jun. 1995, 17 pages.
"Textual Searches on Database Data Using Microsoft SQL Server 7.0", Published on: Jan. 1999, Available at: http://msdn.microsoft.com/en-us/library/aa226176(v=sql.70).aspx.
"SQL Server Full Text Search", Published on: Apr. 22, 2012, Available at: http://msdn.microsoft.com/en-us/library/ms142571.aspx.
"International Search Report and Written Opinion Issued in PCT Patent Application No. PCT/US2014/062309", Mailed Date: Apr. 30, 2015, 10 Pages.
"Second Written Opinion Issued in PCT Application No. PCT/US2014/062309", Mailed Date: Sep. 15, 2015, 6 Pages.
"International Preliminary Report on Patentability Issued in PCT Application No. PCT/US2014/062309", Mailed Date: Jan. 14, 2016, 7 Pages.

* cited by examiner

TEXT SAMPLE ENTRY GROUP FORMULATION

BACKGROUND

Computers and computing systems have affected nearly every aspect of modern living. Computing systems are providing ever more complex and sophisticated functionality. Such functionality is often primarily driven by underlying software, which itself is becoming ever more complex. Some of the more sophisticated functionality involves computing systems communicating one with another using a network. For instance, the Internet is a world-wide consortium of constituent computing networks that allow computing systems to complete communication world-wide.

Such improved capability in communication has allowed information to be more easily shared, and is a large reason why this modern era has often been referred to as the "information age". The improved ease of communication has contributed to the development of data centers, buildings which contain large arrays of data processing and storage power. The volume of information thus available to a user on a computing system is no longer limited to the local storage of the computing system, but extends to the almost infinite variety of information that the computing system may access from other computing systems and data centers throughout the world.

Human beings are, however, only interested in some information, and the interest of a human being varies from person to person and moment to moment. Accordingly, there are mechanisms for sorting through large quantities of information and providing information of higher interest to a user. Conventional mechanisms for doing so including web browsers, search engines, social networks, and so forth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein refer to the storing of text samples in a manner that the text samples may be quickly searched. The text samples are assigned a text sample identifier and are each parsed to thereby extract text components from the text samples. Text components that have the same content are assigned the same text component identifier. For each parsed text component, a text component entry is created that includes the assigned text component identifier as well as the text sample identifier for the text sample from which the text component was parsed. A text sample entry group is created for each text sample that contains the text component entries in sequence for the text components found within the text sample. The text sample entry groups are stored so as to be scannable during a future search.

When searching, the stored text sample entry groups are scanned, potentially only in a single scan. Searches for text component sequences may be performed by scanning through the text component entries, and each time a text component identifier is encountered corresponding to the first text component in the sequence, verifying whether or not the following text component identifiers complete the sequence. Searches for text samples that include, or exclude, certain text components may be made by scanning the text component entries for any of the text components.

In one embodiment, a bitmap may be provided for each text component being searched for as being included, or excluded, from the text sample. In that case, each bit of the bitmap perhaps corresponds to a particular text sample, and is used to record whether or not the corresponding text component was found in the corresponding text sample. Once a text sequence or text component is encountered, the text sample identifier included in the corresponding text component entry is evaluated to determine the text sample, and the corresponding bit is marked. A bitwise logical operation may be performed on the bitmaps to find text samples that include and/or exclude particular text components.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein refer to the storing of text samples in a manner that the text samples may be quickly searched. The text samples are assigned a text sample identifier and are each parsed to thereby extract text components from the text samples. Text components that have the same content are assigned the same text component identifier. For each parsed text component, a text component entry is created that includes the assigned text component identifier as well as the text sample identifier for the text sample from which the text component was parsed. A text sample entry group is created for each text sample that contains the text component entries in sequence for the text components found within the text sample. The text sample entry groups are stored so as to be scannable during a future search.

When searching, the stored text sample entry groups are scanned, potentially only in a single scan. Searches for text component sequences may be performed by scanning through the text component entries, and each time a text component identifier is encountered corresponding to the first text component in the sequence, verifying whether or not the following text component identifiers complete the sequence. Searches for text samples that include, or exclude, certain text components may be made by scanning the text component entries for any of the text components.

In one embodiment, a bitmap may be provided for each text component being searched for as being included, or excluded, from the text sample. In that case, each bit of the bitmap corresponds to a particular text sample, and is used to record whether or not the corresponding text component was found in the corresponding text sample. Once a text sequence or text component is encountered, the text sample identifier included in the corresponding text component entry is evaluated to determine the text sample, and the corresponding bit is marked. A bitwise logical operation may be performed on the bitmaps to find text samples that include and/or exclude particular text components.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
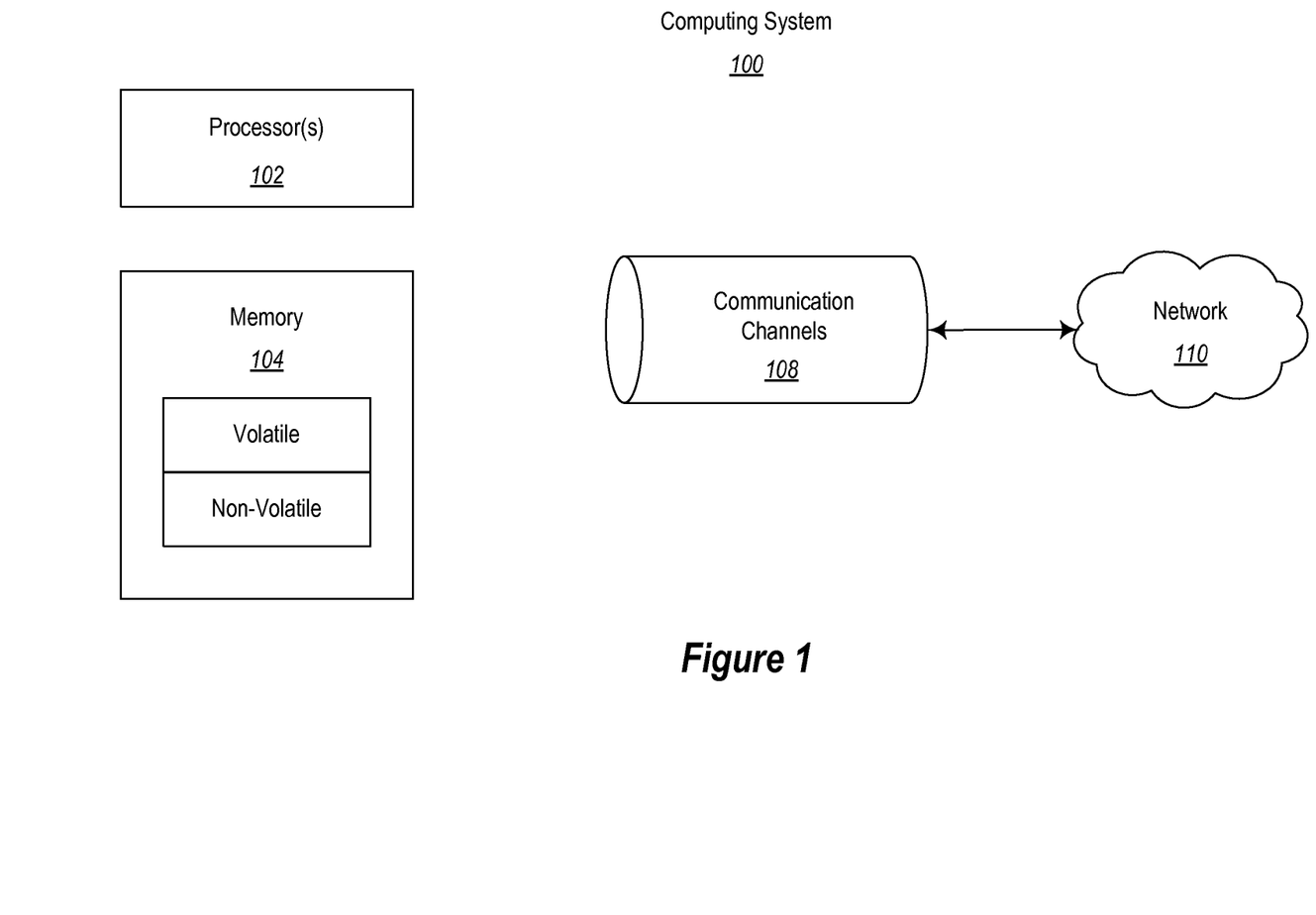
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
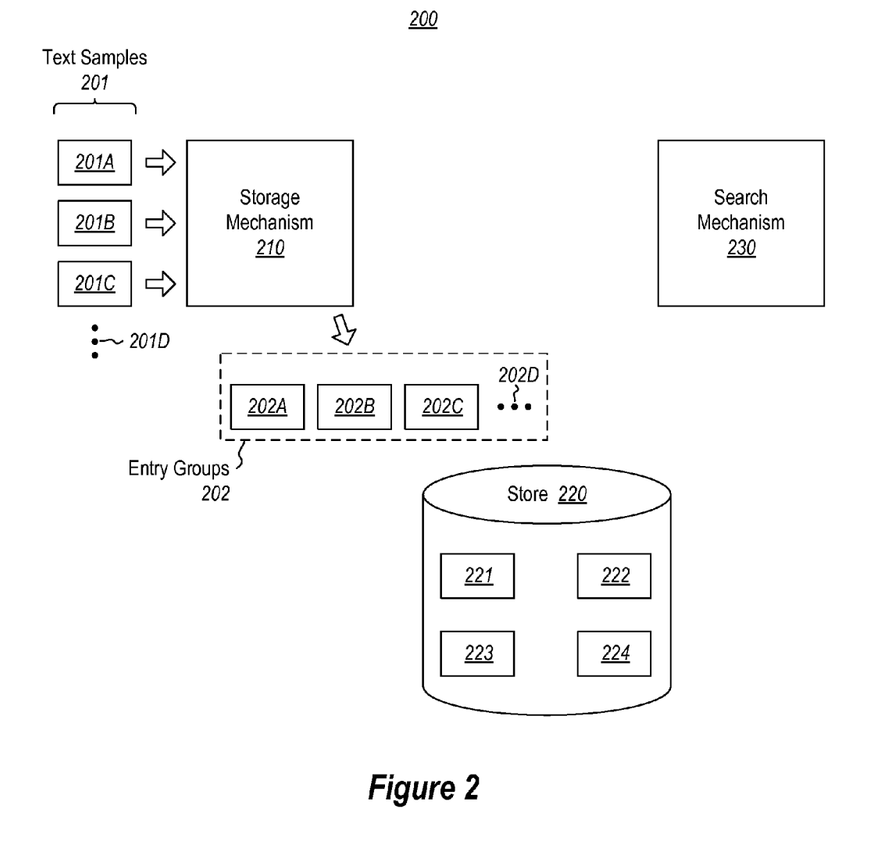
FIG. 2 illustrates a storage system that includes a storage mechanism that operates to formulate text component entries and provide the same to a store, and a searching mechanism in which the principles described herein may operate.

FIG. 2 illustrates a storage system 200 in which the principles described herein may operate. The storage system 200 includes a storage mechanism 210 and a store 220. A searching mechanism 230 is also shown, but is not part of the storage system 200 itself. The searching mechanism 230 is presented to show how the stored text samples are stored in a manner so as to be more efficiently searched in a subsequent search.

Figure 3:
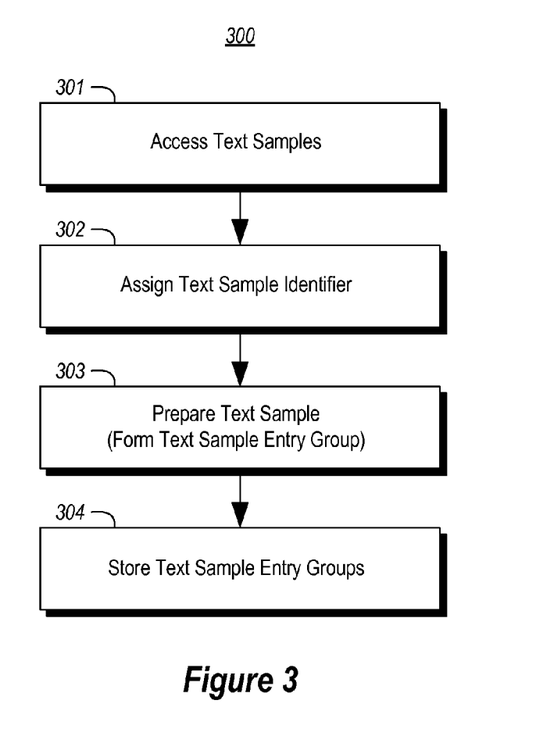
FIG. 3 illustrates a flowchart of a method for storing text samples in accordance with the principles described herein.

FIG. 3 illustrates a flowchart of a method 300 for storing text samples. The method 300 may be performed by the storage mechanism 210 in order to store text samples in the store 220. Accordingly, the method 300 for storing of FIG. 3 will be described with frequent reference to the storage system 200 of FIG. 2.

The storage system accesses a set of text samples (act 301). For instance, referring to FIG. 2, the storage mechanism 210 accesses text samples 201. The text samples are illustrated as including text samples 201A, 201B and 201C, although the ellipses 201D represents that the storage mechanism 210 may access any number of samples. In fact, because the principles described herein allow for fast searching of large quantities of text samples, the storage mechanism 210 may process a large number of text samples and store them within the store 220 so as to be efficiently searchable.

The text samples 201 may be any form of text and in any language. For instance, the text samples 201 might be social network status updates, twitter entries, or any other form of text. Each of the text samples has a corresponding text sample identifier. If the text sample does not have a text sample identifier as accessed, the storage mechanism 210 may assign a text sample identifier (act 302) to the text sample that is unique within the storage system 200.

For at least some, but potentially all, of the accessed set of text samples, the text samples are then prepared (act 303) for storage by creating a text sample entry group for storage. Referring to FIG. 2, the storage mechanism creates text sample entry groups 202. For instance, text sample entry group 202A may represent the text sample 201A, text sample entry group 202B may represent the text sample 201B, and text sample entry group 202C may represent text sample 201C. The ellipses 201D represent there may be other text sample entry groups created by the storage mechanism 210 depending on the number of accessed text samples that are to be stored in accordance with the principles described herein. An example method for preparing the text samples to create text sample group entries is described further below with respect to FIGS. 4 and 5.

The text sample entry groups are stored in a predetermined order by text sample identifier (act 304). For instance, referring to FIG. 2, the text sample entry groups 202 may be stored within a text sample entry group table 221 within the store. The text sample entry groups need not be stored at the same time, but may be stored one at a time once created. Furthermore, as described below, a text sample entry group comprises one or more text component entries. The text sample entry group might be stored only a portion at a time by perhaps storing one text component entry of the text sample entry group at a time.

Figure 4:
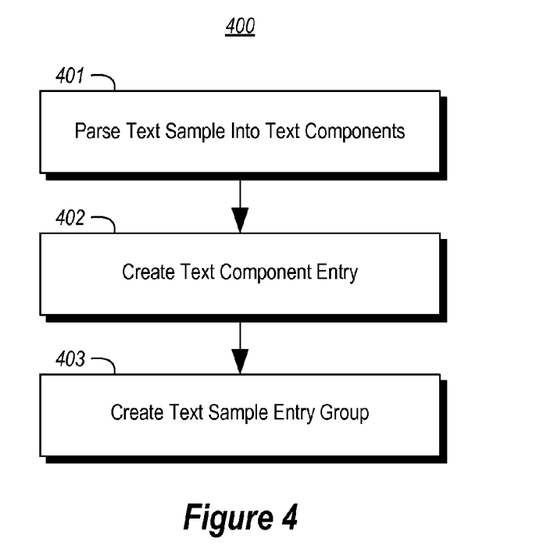
FIG. 4 illustrates a flowchart of a method for preparing the text sample for storage by creating a text sample entry group.
Figure 5:
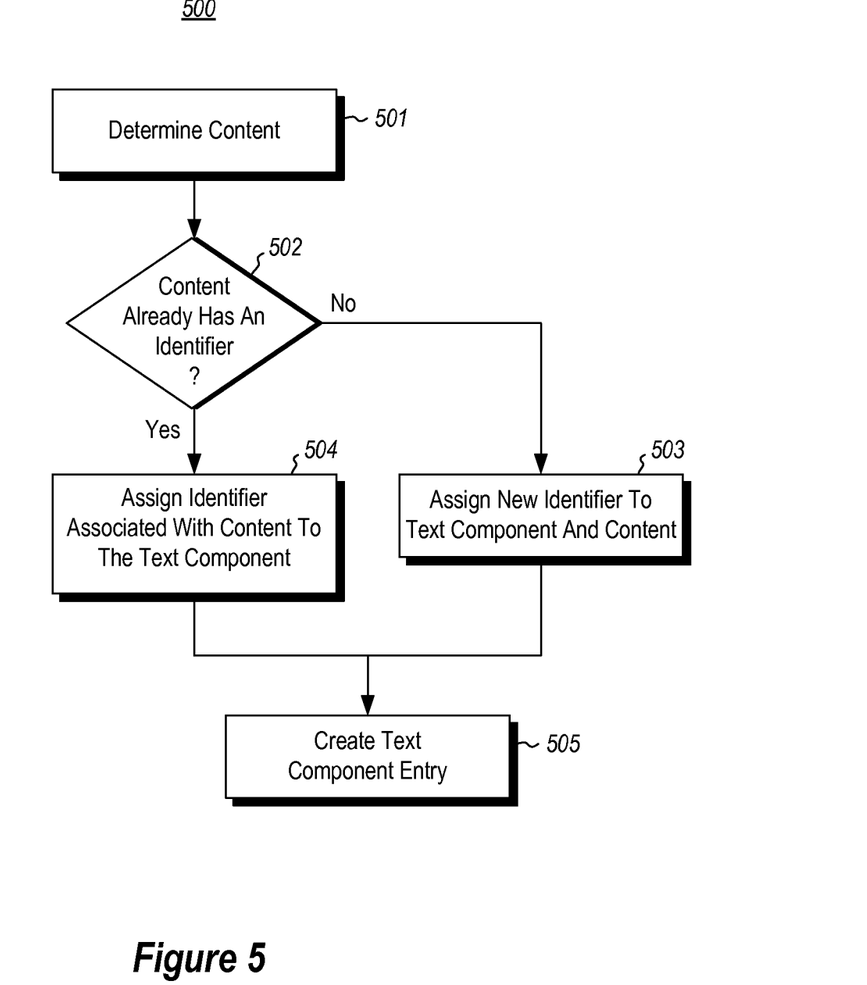
FIG. 5 illustrates a flowchart of a method for creating a text component entry, which may be performed multiple times to complete the method of FIG. 4.
Figure 6:
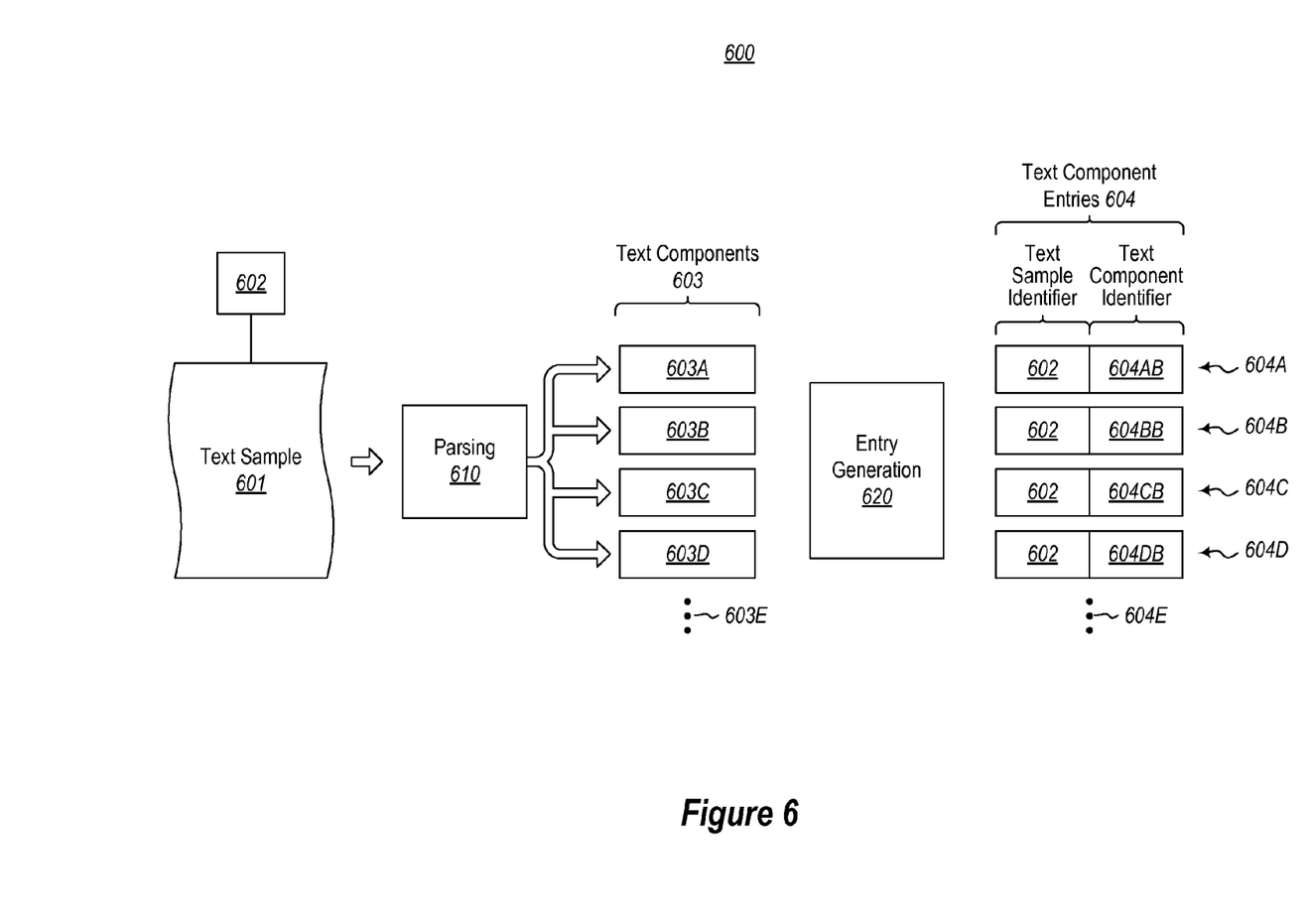
FIG. 6 illustrates an example data flow performed in association with the methods of FIGS. 4 and 5.

FIG. 4 illustrates a flowchart of a method 400 for preparing the text sample for storage by creating a text sample entry group. FIG. 5 illustrates a flowchart of a method 500 for creating a text component entry, which may be performed multiple times to complete the method 400. FIG. 6 illustrates an example data flow 600 performed in association with performing the methods 400 and 500. Accordingly, the method 400 for creating the text sample entry group of FIG. 4 and the method 500 for creating the text component entry of FIG. 5 will be described with frequent reference to the data flow 600 of FIG. 6.

The method 400 for preparing the text sample represents an example of act 302 of FIG. 3 performed with respect to one of the text samples to thereby create a text sample entry group. For instance, referring to FIG. 2, the storage mechanism 210 may perform the method 400 on the text sample 201A to generate the text sample entry group 202A, on the text sample 201B to generate the text sample entry group 202B, and on the text sample 201C to generate the text sample entry group 202C.

In accordance with method 400, one or more text components are parsed from the text sample (act 401). For instance, if the text sample were in English, the text component might each be words. However, the principles described herein are not limited to languages that are Latin-based. For instance, the text sample may be Japanese text, in which case perhaps the text components may be a pictorial character (referred to as "Kanji") or a phonetic character from the hiragana or katakana alphabets. Referring to the data flow 600, a parsing component 610 accesses a text sample 601 associated with a text sample identifier 602 to thereby generate multiple text components 603. For instance, four text components 603A, 603B, 603C and 603D are illustrated as being extracted from the text sample 601. However, the ellipses 603E represents that the principles described herein are not limited to the number of text components that are extracted from the text sample.

The method 400 then includes creating a text component entry that corresponds to the text component for each of the text components (act 402). This act may be performed by the text component entry generation component 620 of FIG. 6 to generate the text component entries 604. For instance, text component entry 604A might represent the text component 603A, text component entry 604B might represent the text component 603B, text component entry 604C might represent the text component 603C, and text component entry 604D might represent the text component 603D. The ellipses 604E represents that the text component entry generation component 620 might generate text component entries for other text components as represented by the ellipses 603E.

FIG. 5 illustrates a flowchart of a method 500 for creating a text component entry. The method 500 may be performed by the text component generation entry generation component 620 on each of the text components 603 to generate the corresponding text component entries 604. For instance, the text component entry generation component 620 may perform the method 500 on the text component 603A to generate the text component entry 604A, on the text component 603B to generate the text component entry 604B, on the text component 603C to generate the text component entry 604C, and on the text component 603D to generate the text component entry 604D.

The method 500 includes determining a content of the text component (act 501), and determining if the content of the text component is already correlated to a text component identifier (decision block 502). In FIG. 2, there is a content/identifier table 222 that correlates each content with an identifier. Suppose, for example, that the text sample being evaluated was a tweet stating "I think I like the movie Superman". The parsing component 610 might parse the text sample into seven word components including "I", "think", "I" "like", "the", "movie" and "Superman". The text component entry generation component 620 would then perform the method 500 on each of these seven words one at a time.

When evaluating "I", this is the first word of the first tweet evaluated. Accordingly, the text component entry generation component 620 would determine that the content "I" is not already associated with a text component identifier ("No" in decision block 502). Accordingly, the text component entry generation component 620 would assign a new text component identifier (e.g., 1) to the text component as well as to the content "I" (act 503). This correlation between content "I" and identifier "1" may be recorded within the content/identifier table 222. The text component entry generation component then creates a text component entry (act 504).

Referring to FIG. 2, the text component entries each include text sample identifier for the text sample from which the text component was parsed, as well as the assigned text component identifier. For instance, given that the text component entries 604 are all derived from the same text sample 601 having identifier 602, the text sample identifier 602 is included with all of the text component entries 604. Likewise, each of the text component entries 604A through 604D includes a corresponding text component identifier 604AB through 604DB, respectively. Thus, in the example above, the text component "I", the first word of the tweet "I think I like the movie Superman may be created using an identifier "1" (perhaps in one column of the table 221) identifying the tweet "I think I like the movie Superman" and with another identifier 1 (perhaps in a second column of the table 221) using identifier "1" which identifies the content "I" when using the table 222, which correlates text component identifiers to content.

Continuing the example, when evaluating "think", this is the second word of the first tweet evaluated. Accordingly, the text component entry generation component 620 would determine that the content "think" is not already associated with a text component identifier ("No" in decision block 502). Accordingly, the text component entry generation component 620 would assign a new text component identifier (e.g., 2) to the text component as well as to the content "think" (act 503). The text component entry generation component then creates a text component entry (act 505). In this case, there would be again a "1" identifier for the tweet, and a "2" identifier identifying the word "think". Thus, the table 221 might contain the following information as represented in Table 1 thus far, and representing the sequence "I think" (the row numbers and headings are added for convenience though not needed in the actual table):

TABLE 1A

| Row # | Text Sample Identifier | Text Component Identifier |
|---|---|---|
| 1 | 1 | 1 |
| 2 | 1 | 2 |

In this description, odd numbered tables 1A through 1G and 3 represent state of the text sample entry group table 221, whereas even numbered tables 2A, 2B and 4 represent state of the content/identifier table 222.

Continuing the example, when evaluating the second instance of "I", this is the third word of the first tweet evaluated. Accordingly, the text component entry generation component 620 would determine that the content "I" is already associated with a text component identifier ("Yes" in decision block 502). Specifically, it was assigned the identifier "1". Accordingly, the text component entry generation component 620 would assign identifier "1" previously assigned to the content "I" to the third text component (act 504). The text component entry generation component then creates a text component entry (act 505). In this case, there would be again a "1" identifier the tweet, and a "1" identifier identifying the word "I". Thus, the table 221 might contain the information illustrated in Table 1B thus far, representing the sequence "I think I":

TABLE 1B

| Row # | Text Sample Identifier | Text Component Identifier |
|---|---|---|
| 1 | 1 | 1 |
| 2 | 1 | 2 |
| 3 | 1 | 1 |

Continuing the example, when evaluating "like", this is the fourth word of the first tweet evaluated. Accordingly, the text component entry generation component 620 would determine that the content "like" is not already associated with a text component identifier ("No" in decision block 502). Accordingly, the text component entry generation component 620 would assign a new text component identifier (e.g., 3) to the text component as well as to the content "like" (act 503). The text component entry generation component then creates a text component entry (act 505). In this case, there would be again a "1" identifier the tweet, and a "3" identifier identifying the word "like". Thus, the table 221 might contain the information represented in table 1C thus far of, representing the sequence "I think I like":

TABLE 1C

| Row # | Text Sample Identifier | Text Component Identifier |
|---|---|---|
| 1 | 1 | 1 |
| 2 | 1 | 2 |
| 3 | 1 | 1 |
| 4 | 1 | 3 |

Continuing, when evaluating "the", this is the fifth word of the first tweet evaluated. Accordingly, the text component entry generation component 620 would determine that the content "the" is not already associated with a text component identifier ("No" in decision block 502). Accordingly, the text component entry generation component 620 would assign a new text component identifier (e.g., 4) to the text component as well as to the content "the" (act 503). The text component entry generation component then creates a text component entry (act 505). In this case, there would be again a "1" identifier the tweet, and a "4" identifier identifying the word "the". Thus, the table 221 might contain the information represented in Table 1D thus far, representing the sequence "I think I like the":

TABLE 1D

| Row # | Text Sample Identifier | Text Component Identifier |
|---|---|---|
| 1 | 1 | 1 |
| 2 | 1 | 2 |
| 3 | 1 | 1 |
| 4 | 1 | 3 |
| 5 | 1 | 4 |

Continuing, when evaluating "movie", this is the sixth word of the first tweet evaluated. Accordingly, the text component entry generation component 620 would determine that the content "movie" is not already associated with a text component identifier ("No" in decision block 502). Accordingly, the text component entry generation component 620 would assign a new text component identifier (e.g., 5) to the text component as well as to the content "movie" (act 503). The text component entry generation component then creates a text component entry (act 505). In this case, there would be again a "1" identifier the tweet, and a "5" identifier identifying the word "movie". Thus, the table 221 might contain the information represented in Table 1E thus far, representing the sequence "I think I like the movie":

TABLE 1E

| Row # | Text Sample Identifier | Text Component Identifier |
|---|---|---|
| 1 | 1 | 1 |
| 2 | 1 | 2 |
| 3 | 1 | 1 |
| 4 | 1 | 3 |
| 5 | 1 | 4 |
| 6 | 1 | 5 |

Finally for the first tweet, when evaluating "Superman", this is the seventh word of the first tweet evaluated. Accordingly, the text component entry generation component 620 would determine that the content "Superman" is not already associated with a text component identifier ("No" in decision block 502). Accordingly, the text component entry generation component 620 would assign a new text component identifier (e.g., 6) to the text component as well as to the content "Superman" (act 503). The text component entry generation component then creating a text component entry (act 505). In this case, there would be again a "1" identifier the tweet, and a "6" identifier identifying the word "Superman". Thus, the table 221 might contain the information represented in Table 1F thus far, representing the sequence "I think I like the movie Superman":

TABLE 1F

| Row # | Text Sample Identifier | Text Component Identifier |
|---|---|---|
| 1 | 1 | 1 |
| 2 | 1 | 2 |
| 3 | 1 | 1 |
| 4 | 1 | 3 |
| 5 | 1 | 4 |
| 6 | 1 | 5 |
| 7 | 1 | 6 |

The content/identifier table 222 associates text content with identifiers and might appear as follows in Table 2A (row number is not added for clarity since the identifier is the same as the row number in this case):

TABLE 2A

| Text Content | Identifier |
|---|---|
| I | 1 |
| think | 2 |
| like | 3 |
| the | 4 |
| movie | 5 |
| Superman | 6 |

Every time that act 503 was performed, a new entry was created in this content/identifier table 222. However, when a text component is encountered that has the same content as that already in the table, then act 504 is performed, and a new entry is not created in the content/identifier table 222. Accordingly, as more and more text samples are evaluated, the likelihood that each additional text component will require an entry in the content/identifier table 222 decreases.

For instance, consider what would happen if the next text sample to be evaluated was "I like the movie Hunger Games". The performance of method 400 would result in a text component entry table 221 that appears as follows in Table 1G:

TABLE 1G

| Row # | Text Sample Identifier | Text Component Identifier |
|---|---|---|
| 1 | 1 | 1 |
| 2 | 1 | 2 |
| 3 | 1 | 1 |
| 4 | 1 | 3 |
| 5 | 1 | 4 |
| 6 | 1 | 5 |
| 7 | 1 | 6 |
| 8 | 2 | 1 |
| 9 | 2 | 3 |
| 10 | 2 | 4 |
| 11 | 2 | 5 |
| 12 | 2 | 7 |
| 13 | 2 | 8 |

Furthermore, there were only two new words "Hunger" and "Games" encountered in this second text sample. Accordingly, only two entries are added to the content/identifier table 222, which would appear as follows in Table 2B:

TABLE 2B

| Text Content | Identifier |
|---|---|
| I | 1 |
| think | 2 |
| like | 3 |
| the | 4 |
| movie | 5 |
| Superman | 6 |
| Hunger | 7 |
| Games | 8 |

A third text sample of "Eliminate world hunger" might result in the following text component entry table 221 represented as Table 3 assuming lack of capitalization sensitivity.

TABLE 3

| Row # | Text Sample Identifier | Text Component Identifier |
|---|---|---|
| 1 | 1 | 1 |
| 2 | 1 | 2 |
| 3 | 1 | 1 |
| 4 | 1 | 3 |
| 5 | 1 | 4 |
| 6 | 1 | 5 |
| 7 | 1 | 6 |
| 8 | 2 | 1 |
| 9 | 2 | 3 |
| 10 | 2 | 4 |
| 11 | 2 | 5 |
| 12 | 2 | 7 |
| 13 | 2 | 8 |
| 14 | 3 | 9 |
| 15 | 3 | 10 |
| 16 | 3 | 7 |

Likewise, since there were two new words "Eliminate" and "world", the content/identifier table 222 would appear as follows in Table 4:

TABLE 4

| Text Content | Identifier |
|---|---|
| I | 1 |
| think | 2 |
| like | 3 |
| the | 4 |
| movie | 5 |
| Superman | 6 |
| Hunger | 7 |
| Games | 8 |
| Eliminate | 9 |
| world | 10 |

The examples of Table 3 and Table 4 will be returned to when discussing searching using the stored tables. Returning briefly to FIG. 4 to complete the method 400, the text group entry groups are created. For instance, in the above example, there are three text sample entry groups represented within table 221, identified within the first column. Note that within the table 221, the text component entries are sorted by sequence of the corresponding text component within the text sample. The store 220 may also contain an identifier/sample table 223 that can return the text sample corresponding to a text sample identifier. The store may also contain a bookmark table 224 that identifies what row of table 221 each text sample begins at.

The storage technique described herein enables fast, single scan searching of previously unparsed text samples. For instances, thousands or millions of tweets may be stored in such a fashion to enable rapid analysis of public sentiment. The remainder of this description focuses on how some types of searches may be performed rapidly on text samples stored in the manner described herein. For instance, text sequence searching, and inclusive and exclusive searching will be described in further detail. That said, the principles described herein are not limited to the type of searching performed on text samples that are stored in accordance with the principles described herein.

Figure 7:
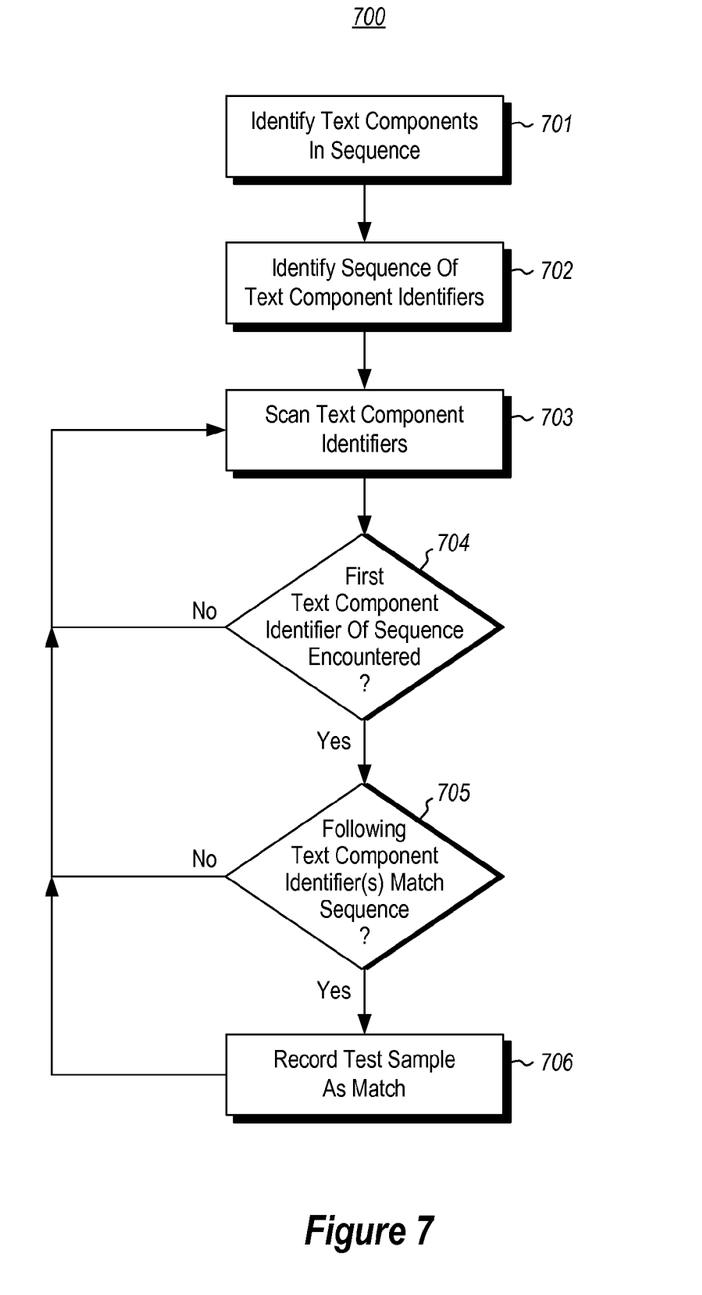
FIG. 7 illustrates a flowchart of a method for performing a sequence search on the storage system of FIG. 2.

First, sequence searching will be described. Sequence searching refers to the searching of a sequence of text components within the text samples. For instance, in the context of the three tweets mentioned above, there will now be an example presented herein in which the user wishes to search for the sequence "Hunger Games". FIG. 7 illustrates a flowchart of a method 700 for performing a sequence search using the storage system 200 of FIG. 2. In one embodiment, the searching may be performed by the searching mechanism 230 of FIG. 2.

In sequence searching, the text components that are composed of the search sequence are first identified (act 701). For instance, the sequence "Hunger Games" may be parsed into the text components "Hunger" and "Games". The text component identifier associated with each text component is then identified (act 702). If there is no text component identifier associated with the text component, then this means that that text component does not appear within any of the text samples, and thus the search results can immediately default to no results. In this case, however, "Hunger" does have a corresponding identifier "7", and "Games" does have a corresponding identifier "8".

The searching mechanism then scans through the text sample identifiers in the text sample entry group table 221 in search of a text component identifier associated with a first text component in the sequence of text components (act 703). For instance, in the example "Hunger Games", associated with sequence 7 (for "Hunger") and 8 (for "Games"), the searching mechanism will scan the text component identifier (i.e., the right) column of the table 221 in search of the identifier 7. In performing the scan, for any given text component entry, if the first text component identifier of the first text component in the sequence is not encountered ("No" in decision block 704), then the scan continues (act 703). Otherwise, for any given text component entry, if the first text component identifier of the first text component in the sequence is encountered ("Yes" in decision block 704), then the scan is temporarily paused, and the text component identifier(s) following the found first text component identifier are evaluated to determine whether or not they match the remainder of the sequence (decision block 705).

For instance, in performing a scan of the right column of Table 3, the scanning operation first encounters the identifier 7 at row 12 (which would result in a "Yes" in decision block 704). Accordingly, without moving the scan itself, the next text component identifier at row 13 is evaluated (decision block 705). It happens that the next text component identifier at row 13 is an "8" and is within the same text sample (since both row 12 and row 13 have the same text sample identifier "2"), and which would complete the sequence properly (since the search sequence is a 7 followed by an 8) ("Yes" in decision block 705). Accordingly, the corresponding text sample identifier 2 is marked as a match (act 706).

The scan continues (act 703) from row 13, and the next time the first text component identifier (e.g., 7) is encountered is at row 16 ("Yes" in decision block 704). However, upon evaluating the next text component identifier in that given text sample, it is discovered that there are no further text components within the text sample ("No" in decision block 705).

Accordingly, the scan continues from row 16. However, there are no further rows to scan, and thus the scan ends. In this example, a single scan of the Table 3 resulted in a complete determination of all of the text samples that continue the search sequence. In this example, the first text sample did not include the text sequence, the second text sample did include the text sequence, and the third text sample did not include the text sequence. This result may be represented by a bitmap in which each bit corresponds to a text sample, and represents whether the term or sequence was found within the corresponding text sample. Thus, the result of the search for "Hunger Games" may be represented compactly as 010.

The searching mechanism 230 may also perform inclusion or exclusion searches as well in an efficient fashion using the storage system 200. For instance, suppose that the user wished to search for all text samples that include the word "hunger" and "world", but not "games". For instance, the user might be a philanthropic individual that is trying to discover levels of concern about world hunger, around the time that a movie called "Hunger Games" has been released.

Figure 8:
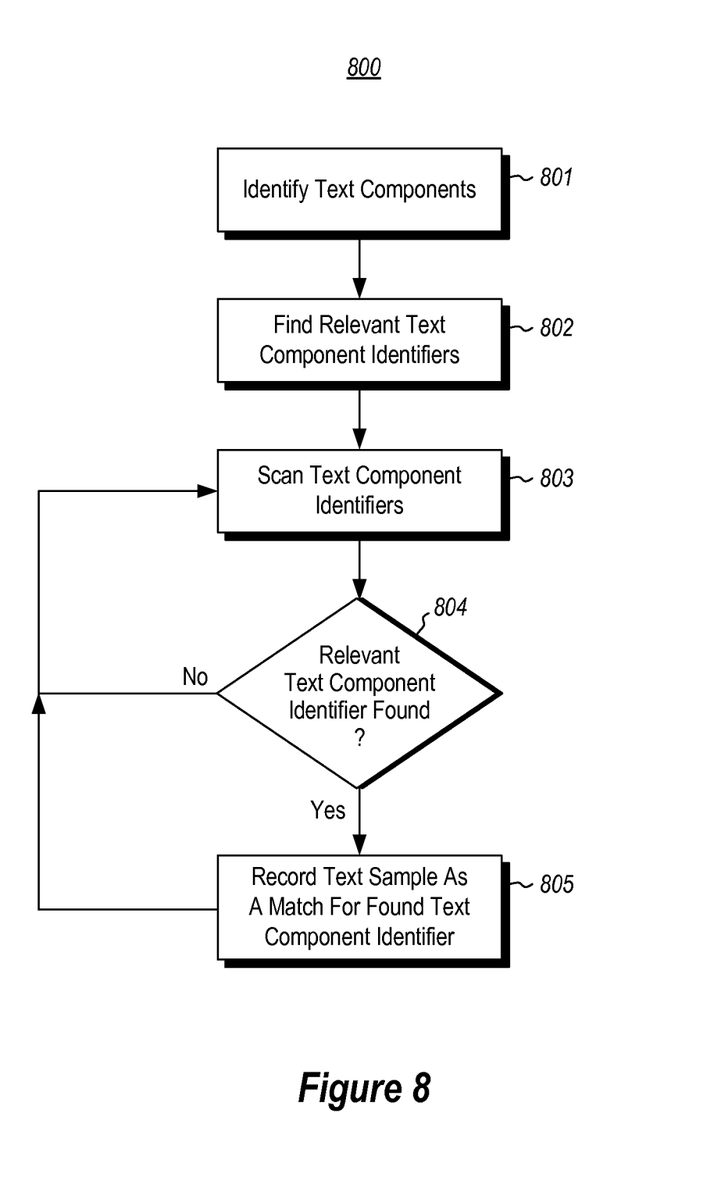
FIG. 8 illustrates a flowchart of a method for performing an inclusion/exclusion search on the storage system of FIG. 2.

All of the text components, whether those to be included, or those to be excluded, may be found in a single scan of the table 221. FIG. 8 illustrates a flowchart of a method 800 for performing a multi-term search. First, the text components are identifier (act 801). In this example, in which the user wishes to find all text samples having the terms "world" and "hunger", but not "games", the text components are "world", "hunger" and "games". The associated text component identifiers are then found (act 802). For instance, in the example, the relevant text component identifiers include 10 for "world", 7 for "hunger", and 8 for "games".

The searching mechanism then scans (act 803) through the text sample identifiers of the text sample entry groups in search of any of the text component identifiers. For any given row in the scan, if the text component identifier does not match any of the relevant text component identifiers of the search ("No" in decision block 804), then the scan continues to the next row (act 803). If the text component identifier does match any of the relevant text component identifiers of the search ("Yes" in decision block 804), then the text sample is recorded as a match (act 806).

For instance, applying the relevant text component identifiers 7, 8 and 10, the first instance of encountering this in Table 3 would be at row 12 at which point text component identifier 7 is encountered. The corresponding text sample identifier is 2, and thus text sample 2 is marked as containing the text component identifier 7. At row 13, the text component identifier 8 is encounter. The corresponding text sample identifier is 2, and thus text sample 2 is marked as containing the text component identifier 8. At row 15, the text component identifier 10 is encountered. The corresponding text sample identifier is 3, and thus text sample 3 is marked as containing text component identifier 10. At row 16, text component identifier 7 is again encountered. The corresponding text sample identifier is 3, and thus text sample 3 is marked as containing the text component identifier 7. Thus, text component identifier 7 is found in text samples 2 and 3, text component identifier 8 is found in text sample 2, and text component identifier 10 is found in text sample 3. Again, bitmaps may be used for each of the text component identifiers in the original search request, with each bit representing a text sample, and its value representing whether or not the text component identifier was found in the corresponding text sample. In the example, the following bitmaps may correspond to the input text component identifiers as follows in Table 5:

TABLE 5

| Text Component Identifier | Inclusion or Exclusion | Bitmap |
| --- | --- | --- |
| 7 | Inclusion | 011 |
| 8 | Exclusion | 010 |
| 9 | Inclusion | 001 |

Also included is an indication of whether the text component identifier was an inclusion search term or an exclusion search term.

The result of the search in this case may involve perform a bit-wise logical operation on the resulting bitmaps associated with teach search term. The bit-wise operation might involve bit-wise logically AND'ing the bitmaps associated with text components that are to be included in the resulting text samples, and the bit-wise complement of the bitmaps associated with text components that are to be excluded in the resulting text samples. In the example Table 5, bit maps 011 (the bitmap for text component identifier 7) would be bit-wise logically AND'ed with bitmap 101 (the bit-wise complement bitmap for text component identifier 8) and with bitmap 001 (the bitmap for text component 10). The result is bitmap 001, which reveals that the final result of the search is just text sample 3.

Thus, the search involved a single scan of the table 221, even for more complex searches. The reader will likely recognize that there are similarities between the method 700 for performing sequential searches, and the method 800 for performing inclusion/exclusion searches. The methods 700 and 800 may be combined to include text sequence as terms within an inclusion/exclusion search. The only difference would be that when performing the scan (act 803), the first text component of the text sequence that is also included as a term in the inclusion/exclusion search will also be searched for.

For instance, consider a search in which the user states that they want to find all text samples that include the term "world", but not "Hunger Games". In that case, the text component identifiers would be 9 (for "world") and 7 followed by 8 (for "Hunger Games"). For the sequence, only the first text component identifier 7 would be scanned for in act 803 (along with of course text component identifier 9). In the case that text component identifier 7 is found, act 705 would be performed. If the subsequent text component identifier is found to not match the remainder of the sequence ("No" in decision block 704), then the method 800 would return to act 803. If the subsequent text component identifier is found to match the remainder of sequence ("Yes" in decision block 704), then the method 800 would move forward to act 806. Thus, the bitmap for the sequence "Hunger Games" would be 010. The bitmap for the text component "world" would be 001. "Hunger Games" is an exclusion term and the bit-wise complement bitmap 101 would be logically AND'ed with the bitmap 001 for the text component "Games", resulting in a resulting bitmap 001. Again, this reveals that the text sample 3 is a match.

Accordingly, the principles described herein provide an effective and efficient mechanism for storing text samples in a manner that they may be quickly searched through.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method comprising:
   an act of accessing a set of text samples, each having a corresponding text sample identifier;
   for each of at least some of the set of text samples, an act of preparing the text sample, the act of preparing the text sample comprising:
      an act of parsing a plurality of text components from the text sample; and
      for each of at least some of the parsed plurality of text components, an act of identifying the text component, the act of identifying the text component comprising:
         an act of determining if the text component is already correlated to a text component identifier, the text component identifier representing the content while being distinguished from the content;
         if the text component is already correlated to a text component identifier, assigning the text component identifier to the text component and such that when two text components are the same then the two text components will be assigned a same text component identifier;
         if the text component is not already correlated to a text component identifier, assigning a new text component identifier to the text component; and
         an act of creating a text component entry comprising a) the text sample identifier for the text sample from which the text component was parsed, and b) the assigned text component identifier;
      an act of creating a text sample entry group comprising a plurality of text component entries corresponding to text components parsed from the text sample, and such that the plurality of text component entries are sorted by sequence of the corresponding text component within the text sample; and
   an act of storing a plurality of text sample entry groups created by performance of the act of preparing the text sample for each of the at least some of the set of text samples, wherein the pluarity of text samples entries are stored in a text component entry table that includes a duplicate set of text component entries having a same text sample identifier and component identifier pairing.

2. The method in accordance with claim 1, wherein the act of storing comprises an act of storing the plurality of text sample entry groups in a predetermined ordering by text sample identifier.

3. The method in accordance with claim 1, further comprising:
   an act of performing a search on the plurality of text sample entry groups.

4. The method in accordance with claim 3, wherein the act of performing a search comprises an act of performing a search for a sequence of text components, the method comprising:
   an act of identifying a plurality of text components in the sequence of text components to be searched for;
   an act of scanning through the text sample identifiers of the plurality of text sample entry groups in search of a text component identifier associated with a first text component in the sequence of text components;
   whenever upon finding a text component identifier associated with the first text component during the act of scanning, performing the following:
      an act of confirming whether or not the found text component identifier in association with one or more text component identifiers that follow within the same text sample entry group collectively identify the sequence of text components to be searched for; and
      if the act of confirming confirms that the found text component identifier in association with the one or more text component identifiers that follow within the same text sample entry group do collectively identify the sequence of text component to be searched for, an act of using the corresponding text sample identifier to identify the text sample that includes the sequence to be searched for.

5. The method in accordance with claim 3, wherein the act of performing a search comprises an act of performing a search for a text sample that includes a first particular text component, the method comprising:
   an act of scanning through the text sample identifiers of the plurality of text sample entry groups in search of a first particular text component identifier that identifies the first particular text component;
   whenever upon finding the first particular text component identifier during the act of scanning, an act of using the corresponding text sample identifier to identify the text sample that includes the first particular text component.

6. The method in accordance with claim 5, wherein the act of using the corresponding text sample identifier to identify the text sample that includes the first particular text component comprises:
   an act of using a bit of a first bitmap to record that the text sample includes the first particular text component to be searched for, wherein the first bitmap has a corresponding bit for each text sample in the set of text samples.

7. The method in accordance with claim 5, wherein the act of performing a search comprises an act of performing a search for a text sample that includes the first particular text component and a second particular text component,
the act of scanning also performed in search of a second particular text component identifier that identifies the second particular text component;
whenever upon finding the second particular text component identifier during the act of scanning, an act of using the corresponding text sample identifier to identify the text sample that includes the second particular text component, the method further comprising:
an act of identifying a result of the search as including at least some of the text samples that include the first particular text component and the second particular text component.

8. The method in accordance with claim 7,
wherein the act of using the corresponding text sample identifier to identify the text sample that includes the first particular text component comprises an act of using a bit of a first bitmap to record that the text sample includes the first particular text component, wherein the first bitmap has a corresponding bit for each text sample in the set of text samples, and
wherein the act of using the corresponding text sample identifier to identify the text sample that includes the second particular text component comprises an act of using a bit of a second bitmap to record that the text sample includes the second particular text component, wherein the second bitmap also has a corresponding bit for each text sample in the set of text samples.

9. The method in accordance with claim 8, wherein the act of identifying a result of the search as including at least some of the text samples that include the first particular text component and the second particular text component comprises:
an act of performing a bit-wise logical operation on the first bit map and the second bit map to formulate a resulting bit map, wherein the resulting bitmap also has a corresponding bit for each text sample in the set of text samples.

10. The method in accordance with claim 7, wherein the act of performing a search comprises an act of performing a search for a text sample that includes the first particular text component and a second particular text component, but which does not include a third particular text component,
the act of scanning also performed in search of a third particular text component identifier that identifies the third particular text component;
whenever upon finding the third particular text component identifier during the act of scanning, an act of using the corresponding text sample identifier to identify the text sample that includes the third particular text component, the method further comprising:
an act of identifying a result of the search as including at least some of the text samples that include the first particular text component and the second particular text component, but which does not include the third particular text component.

11. The method in accordance with claim 10,
wherein the act of using the corresponding text sample identifier to identify the text sample that includes the first particular text component comprises an act of using a bit of a first bitmap to record that the text sample includes the first particular text component, wherein the first bitmap has a corresponding bit for each text sample in the set of text samples,
wherein the act of using the corresponding text sample identifier to identify the text sample that includes the second particular text component comprises an act of using a bit of a second bitmap to record that the text sample includes the second particular text component, wherein the second bitmap also has a corresponding bit for each text sample in the set of text samples, and
wherein the act of using the corresponding text sample identifier to identify the text sample that includes the third particular text component comprises an act of using a bit of a third bitmap to record that the text sample includes the third particular text component, wherein the third bitmap also has a corresponding bit for each text sample in the set of text samples.

12. The method in accordance with claim 11, wherein the act of identifying a result of the search as including at least some of the text samples that include the first particular text component and the second particular text component, but which does not include the third particular text component, comprises:
an act of performing a bit-wise logical operation on the first bit map, the second bit map and the third bit map to formulate a resulting bit map, wherein the resulting bitmap also has a corresponding bit for each text sample in the set of text samples.

13. The method in accordance with claim 5, wherein the act of performing a search comprises an act of performing a search for a text sample that includes the first particular text component, but which also does not include a second particular text component,
the act of scanning also performed in search of a second particular text component identifier that identifies the second particular text component;
whenever upon finding the second particular text component identifier during the act of scanning, an act of using the corresponding text sample identifier to identify the text sample that includes the second particular text component, the method further comprising:
an act of identifying a result of the search as including at least some of the text samples that include the first particular text component, but which does not include the second particular text component.

14. The method in accordance with claim 13,
wherein the act of using the corresponding text sample identifier to identify the text sample that includes the first particular text component comprises an act of using a bit of a first bitmap to record that the text sample includes the first particular text component, wherein the first bitmap has a corresponding bit for each text sample in the set of text samples, and
wherein the act of using the corresponding text sample identifier to identify the text sample that includes the second particular text component comprises an act of using a bit of a second bitmap to record that the text sample includes the second particular text component, wherein the second bitmap also has a corresponding bit for each text sample in the set of text samples.

15. The method in accordance with claim 14, wherein the act of identifying a result of the search as including at least some of the text samples that include the first particular text component, but which also does not include the second particular text component comprises:
an act of performing a bit-wise logical operation on the first bit map and the second bit map to formulate a resulting bit map, wherein the resulting bitmap also has a corresponding bit for each text sample in the set of text samples.

16. A computer program product comprising one or more computer-readable storage media having thereon computer-executable instructions that are structured such that, when executed by one or more processors of a computing system, cause the computing system to perform a method for storing representations of a set of text samples, each having a corresponding text sample identifier, the method comprising:

an act of creating a content identification table that includes text components and corresponding text component identifier pairings, that act of creating including for each of at least some of the set of text samples:
an act of parsing a plurality of text components from the text sample; and
for each of at least some of the parsed plurality of text components, an act of identifying the text component, the act of identifying the text component comprising:
an act of determining if the text component is already correlated to a text component identifier, the text component identifier representing the content while being distinguished from the content;
if the text component is already correlated to a text component identifier, assigning the text component identifier to the text component;
if the text component is not already correlated to a text component identifier, assigning a new text component identifier to the text component as a text component and corresponding text component identifier pairing; and
an act of creating a text component entry comprising a) the text sample identifier for the text sample from which the text component was parsed, and b) the assigned text component identifier;
while creating the content identification table, refraining from creating a new entry in the content identification table for a text component that is encountered that is the same as another text component in the content identification table, and such that the content identification table omits duplicate entries of the text component and corresponding text component identifier pairing; and an act of creating a text component entry table by at least:
creating a text sample entry group comprising a plurality of text component entries corresponding to text components parsed from the text sample, and such that the plurality of text component entries are sorted by sequence of the corresponding text component within the text sample; and
an act of storing a plurality of text sample entry groups created by performance of the act of preparing the text sample for each of the at least some of the set of text samples.

17. The computer program product in accordance with claim 16, wherein the act of storing comprises an act of storing the plurality of text sample entry groups in a predetermined ordering by text sample identifier.

18. A computing system comprising:
at least one processor; and
one or more storage device having stored computer-executable instructions that are executable by the at least one processor to cause the computing system to implement the following:
an act of accessing a set of text samples, each having a corresponding text sample identifier;
for each of at least some of the set of text samples, an act of preparing the text sample, the act of preparing the text sample comprising:
an act of parsing a plurality of text components from the text sample; and
for each of at least some of the parsed plurality of text components, an act of identifying the text component, the act of identifying the text component comprising:
an act of determining if the text component is already correlated to a text component identifier, the text component identifier representing the content while being distinguished from the content;
if the text component is already correlated to a text component identifier, assigning the text component identifier to the text component;
if the text component is not already correlated to a text component identifier, assigning a new text component identifier to the text component; and
an act of creating a text component entry comprising a) the text sample identifier for the text sample from which the text component was parsed, and b) the assigned text component identifier;
an act of creating a text sample entry group comprising a plurality of text component entries corresponding to text components parsed from the text sample, and such that the plurality of text component entries are sorted by sequence of the corresponding text component within the text sample;
an act of storing a plurality of text sample entry groups created by performance of the act of preparing the text sample for each of the at least some of the set of text samples, the plurality of text sample entry groups being stored in a predetermined ordering by text sample identifier,
an act of performing a search on the plurality of sample entry groups, wherein the act of performing a search comprisies:
scanning through the text sample identifiers of the plurality of text sample entry groups in search of a first particular text component identifier that identifies a first particular text component and a second particular text component identifier that identifies a second particular text component, and upon finding the first and second particular text component identifiers during the act of scanning, an act of using text sample identifiers corresponding to the first and second particular text component identifiers to identify one or more text samples that include the first particular text component and to identify one or more text samples that include the second particular text component, and
an act of identifying a result of the search, the result including at least some of the text samples that include the first particular text component and the second particular text component, or identifying a result of the search as including at least some of the text samples that include the first particular text component but which omit the second particular text component.

19. The computing system of claim 18, wherein the result includes the said at least some of the text samples that include the first particular text component and the second particular text component.

20. The computing system of claim 18, wherein the result includes said at least some of the text samples that include the first particular text component but which omit the second particular text component.

* * * * *